United States Patent [19]
Yen

[11] Patent Number: 5,262,063
[45] Date of Patent: Nov. 16, 1993

[54] MULTIPLE-STAGE PRECIPITATION PROCESS FOR HEAVY METALS IN AQUEOUS SOLUTION

[75] Inventor: Jeffrey H. Yen, Woolwich, N.J.

[73] Assignee: Elf Atochem North America, Inc., Philadelphia, Pa.

[21] Appl. No.: 882,774

[22] Filed: May 14, 1992

[51] Int. Cl.$^5$ .............................................. C02F 1/58
[52] U.S. Cl. ................................. 210/724; 210/726; 210/911; 423/87; 423/602; 423/617; 423/43; 423/47
[58] Field of Search ............... 210/724, 911, 912, 726; 423/87, 601, 602, 617, 42, 43, 47

[56] References Cited

U.S. PATENT DOCUMENTS

| | | | |
|---|---|---|---|
| 3,800,024 | 3/1974 | Forsell et al. | 210/724 |
| 4,343,706 | 8/1982 | Etzel et al. | 210/724 |
| 4,503,017 | 3/1985 | Gadd et al. | 210/724 |
| 4,566,975 | 1/1986 | Allgulin | 210/911 |
| 4,652,380 | 3/1987 | Wheeler | 210/724 |
| 4,680,126 | 7/1987 | Frankard et al. | 210/724 |
| 5,009,793 | 4/1991 | Muller | 210/724 |
| 5,093,007 | 3/1992 | Domvile | 210/724 |
| 5,114,592 | 5/1992 | Schuster et al. | 210/724 |
| 5,128,047 | 7/1992 | Stewart et al. | 210/724 |
| 5,137,640 | 8/1992 | Poncha | 210/724 |

Primary Examiner—Stanley S. Silverman
Assistant Examiner—Neil M. McCarthy

[57] ABSTRACT

In the process of removing heavy metals from aqueous solutions by precipitation of a salt thereof at increased pH, multiple stage precipitation by upward stepwise pH adjustment and solid separation at each stage is used to facilitate the manufacture of a product of high purity.

8 Claims, 2 Drawing Sheets

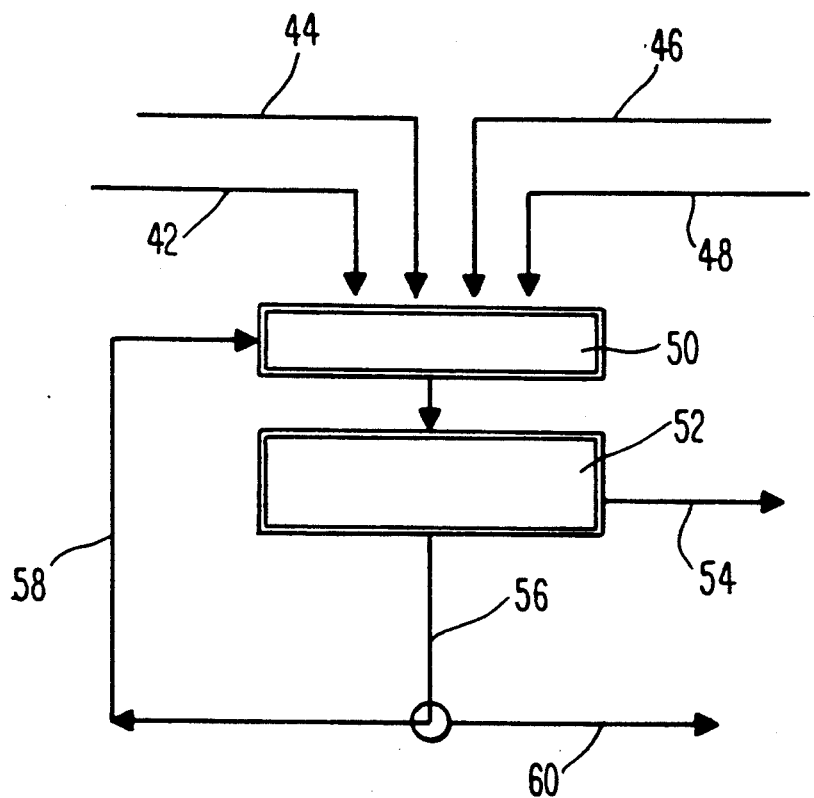
_Fig. 2_

MULTIPLE-STAGE PRECIPITATION PROCESS FOR HEAVY METALS IN AQUEOUS SOLUTION

BACKGROUND OF THE INVENTION

This invention concerns a method for the removal of at least one heavy metal, e.g., arsenic, lead, tin and the like, from water in which it is dissolved, by the precipitation of a salt thereof in multiple steps. More particularly, it concerns a multi-stage process for the removal of one or more heavy metals from contaminated water wherein the metal is precipitated from solution in the form of a salt and the filtrate reprocessed one or more times at progressively higher pH to further precipitate metal therefrom. The process is useful for the treating of industrial, surface and underground wastewater to produce potable water and solid metal salts which may be reused for industrial purposes, such as copper arsenate to make wood preservatives.

PRIOR ART

It is known to remove heavy metals from water contaminated therewith, by various means. Precipitation of their salts is known and disclosed, for example, in U.S. Pat. No. 4,959,203 which teaches the precipitation of copper arsenate from a solution of copper sulfate to which a water-soluble arsenate solution is added and the resulting solution mixture neutralized to precipitate copper arsenate. The precipitation technique is preferred, in some instances, because it is possible to process water contaminated with heavy metals and provide useful products which do not cause waste disposal problems. For example, arsenic containing groundwater can be treated to form copper arsenate, for use in making wood preservatives, and potable water. The present invention is an improvement on the precipitation process wherein the facile production of potable drinking water is realized from the processing of heavy metal contaminated water.

THE DRAWINGS

FIG. 1 is a diagrammatic representation of the multi-stage process of this invention carried out in multiple reactors, and FIG. 2 is a diagrammatic representation of the multi-stage process of this invention carried out in a single reactor.

STATEMENT OF THE INVENTION

This invention is a process for the removal of at least one heavy metal from an aqueous solution contaminated therewith wherein said metal is formed into a water-soluble salt in said solution at a mildly acid pH and then precipitated by adjusting the pH of said solution upward, the improvement comprising adjusting the pH upward until precipitation begins to form a first precipitate, separating said first precipitate from said solution, further adjusting the pH upward to form a second precipitate, separating said second precipitate from said solution, and optionally, further adjusting the pH upward to form a third precipitate and separating said third precipitate from said solution. The process may be carried out in a single reactor or multiple reactors as depicted in the accompanying drawings.

DETAILED DESCRIPTION OF THE INVENTION

Figure 1:
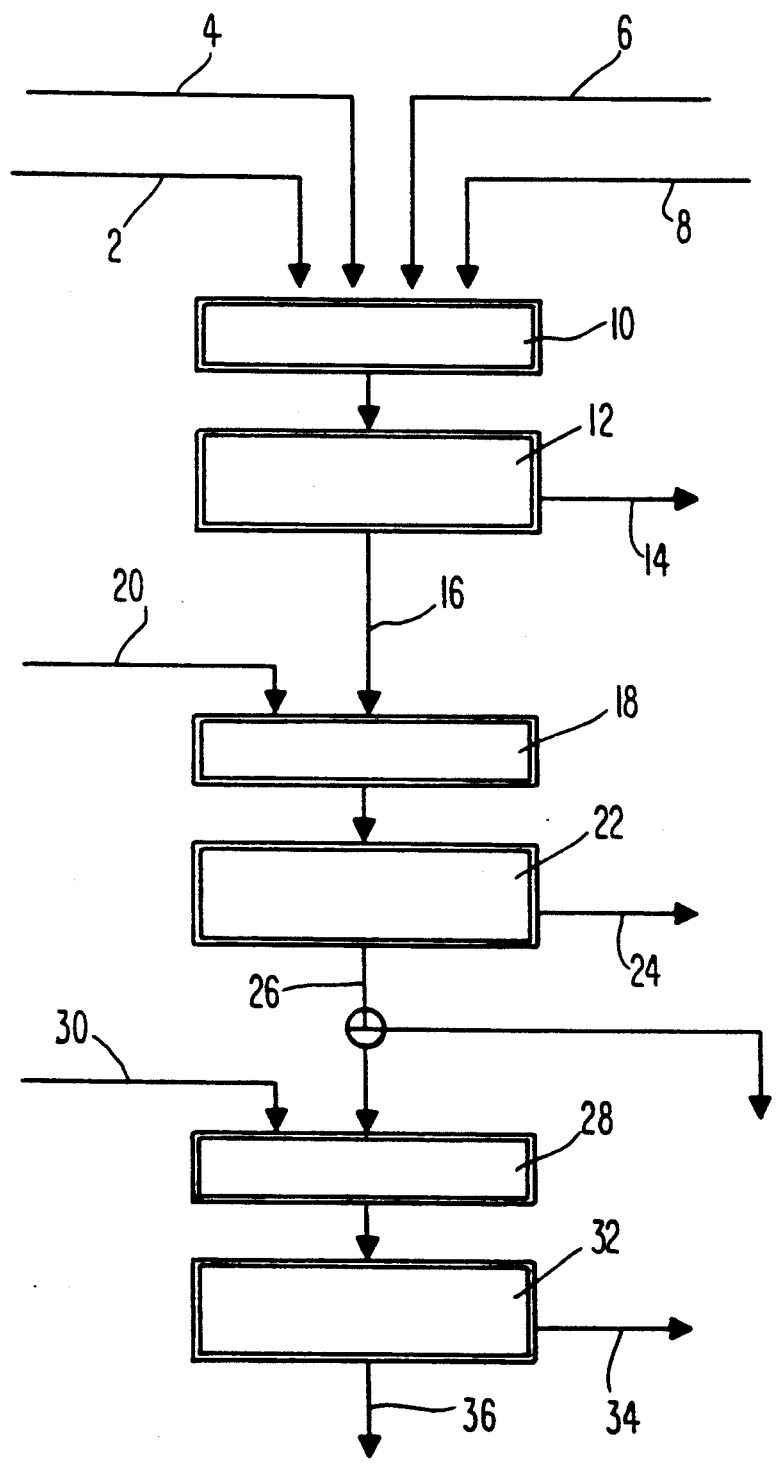

This invention is a process for the removal of at least one heavy metal from an aqueous solution contaminated therewith wherein said metal is formed into a water-soluble salt in said solution at a mildly acid pH and said salt is precipitated by adjusting the pH of said solution upward. The improvement in such process comprises treating said solution in multiple stages wherein the pH of the solution containing the dissolved salt is adjusted upward until precipitation begins and a first precipitate is formed. The first precipitate is separated from the aqueous solution and the pH of said solution is further adjusted upward until precipitation occurs again and a second precipitate is formed. The second precipitate is separated from the aqueous solution and, optionally, the previous step is repeated to form a third precipitate which is also separated from the aqueous solution.

Optionally, the solution to be treated is oxidized, prior to salt formation, to convert any heavy metal of lower valency to a higher and more reactive metal ion. For example, trivalent arsenic, if present, will be converted to pentavalent arsenic by the oxidizing agent. This preoxidation will also serve to oxidize any organic impurities in the aqueous solution which could interfere with the precipitation of the formed metal salts. Organics which act as chelating agents to bind the heavy metal and prevent precipitation are especially in need of oxidation. Oxidizing agents are used which will accomplish the intended purpose and not themselves interfere with the relevant reaction or precipitation in the amounts employed. That is, the oxidizing agents should not raise the pH of the metal-containing solution to the degree that precipitation will occur on the addition of the salt-forming agent. Oxidizing agents which are useful for this process include, for example, ozone, hydrogen peroxide, sulfuric acid, nitric acid, hydrochloric acid, and the like. These agents are used in amounts sufficient to convert lower valent heavy metals to a higher valency and to oxidize organic contaminants sufficiently to prevent their interference with precipitation by the metal salt on pH adjustment in the process. In general, amounts of sulfuric acid or nitric acid as oxidizing agents to be added to the heavy metal-containing aqueous solution range from 1 g/L to 5g/L; preferably 1.5 to 2.5 g/L based on the volume of water in the aqueous solution to be treated.

Of course, if all heavy metal present in the solution is in its higher valency form and no organics are present in the solution, the oxidizing step may be omitted.

A precipitation-enhancing agent may also be used in the process of the present invention to provide improved and quicker filtration of the formed precipitate. The step of mixing this agent with the solution maximizes the particle size and can be accomplished either before, during or after the heavy metal is converted to the water-soluble salt at acid pH. Preferably, the enhancing agent is added before the heavy metal is converted or before the contaminated solution is pumped to the reactor. Any inorganic salts with a crystal structure similar to that of the precipitate can be used as the precipitation-enhancing agent. Preferred precipitation-enhancing agents include, for example, sulfuric acid, calcium sulfate, arsenic trioxide, and calcium arsenate. If the enhancing agent is the same as the oxidizing agent, e.g., sulfuric acid, its addition will accomplish both purposes.

To facilitate description of this invention, arsenic will be used hereinafter to represent heavy metals which also include, for example, lead, chromium and tin. These materials will exist in ionic form in the aqueous solution.

Arsenic is removed from water containing it by reacting the arsenic in solution with an inorganic water-soluble metal salt wherein the metals are those, for example, of the Groups Ib, IIa, IIb, VIIb and VIII of the periodic table. Preferred salts are cupric nitrate, cupric chloride, copper sulfate, zinc nitrate and the like which form water-soluble metal arsenates in solution at an acid pH, e.g., from about 1 to 2. The amount of copper or equivalent salt introduced into the arsenic-containing solution is determined by the arsenic content of the solution and, based on a stoichiometric ratio of metal to arsenic, will be from about 1.3:1 to about 2:1 and preferably from about 1:4:1 to 1.6:1. The typical pH of most underground water is between 5 and 8. On addition of the water-soluble salt to the arsenic solution, the pH of the solution will be lowered to about 1–2 and is generally maintained between 1 to 3, preferably about 2 during the reaction stage. The reaction stage is preferably carried out for 5 minutes to two hours, more preferably about 10–20 minutes, at a temperature of about 30° C. to below the boiling point of the reaction solution, more preferably between about 35° to about 60° C.

The pressure at which the process is operated is not critical, ambient or atmospheric being preferred.

The reaction is generally carried out with agitation in either a batch or continuous system, e.g., continuous stirred tank reactor. It is preferable to have a ditched bottom reactor with an agitator diameter-to-reactor vessel diameter being about 0.4 to about 0.55. Agitation during the reaction will be mild with mostly axial flow and low shear force to avoid shearing of precipitate particles when precipitation occurs. Examples of the agitators include, but are not limited to hydrofoil agitators, such as Lightnin A310 and A315, and profiles agitators, such as Mixel Profile propellers TT, TTP and TTM. It is preferable to locate the injection ports for inorganic metal salt slightly above the agitator blades. It is also preferred to have a tubular anchor close to the bottom of the reactor in order to avoid the accumulation of precipitate in the bottom of the reactor.

In accordance with the present invention, in a first stage, the arsenate is preferably precipitated by adjusting the pH of the aqueous solution upward from about 1–2 to about 2.5–4.5 causing the formation of a first precipitate. This precipitate is separated from the aqueous solution as a solid metal arsenate, preferably copper arsenate, in a conventional liquid/solid separator, e.g., a filter press.

Following separation of the first precipitate, the pH of the aqueous solution (or filtrate) is again adjusted upward from 2.5–4.5 to 4.5–7 to cause the formation of a second precipitate, most likely a mixture of $Cu_3(AsO_4)_2$, $CuHAsO_4$, etc., which is separated, as above, from the aqueous solution. If desired and if residual metal arsenate is present, the pH of the aqueous solution (new filtrate) may again be raised (e.g., above 7) to produce additional precipitate, most likely a mixture of $CuHAsO_4$, $CuHAsO_3$, etc.

Adjustment of the pH upward in the reaction system is accomplished by adding an alkali or alkaline earth metal hydroxide, ammonia or equivalent base material to the arsenate-containing aqueous solution. The base material may be in solid or solution form as desired. Addition of the basic material is preferably accomplished over an extended period at each stage, e.g. 10 to 30 minutes, to obtain optimum precipitation at each stage.

To further describe the multi-stage process of this invention, reference is made to FIG. 1 of the drawing which represents a multiple reactor embodiment. Lines 2, 4, 6 and 8 deliver wastewater, sulfuric acid, inorganic metal salt and caustic, respectively, to the reactor 10 at the direction of the operator. Reactor 10 may be heated by external or internal means to maintain the reactor at the desired temperature, at least about 100° F. (37.8° C.), preferably 130°–140° F. (54.4°–60° C.), and contains agitator means, e.g., an electric stirrer. Wastewater (ground water as hereinafter described) is pumped into the reactor while the reactor temperature is raised to 130°–140° F. and then sulfuric acid is incorporated in the appropriate amount as the mixture is mildly agitated. When the pH is lowered to the desired level (e.g., 1.2–1.5) a water soluble salt, e.g., cupric nitrate is pumped to the reactor in at least a stoichiometric amount based on the arsenic content of the wastewater, and the reaction is carried on for about 10–20 minutes. On completion of the reaction, caustic is slowly incorporated into the reactor preferably in the form of NaOH solution or granulates to raise the reactor pH to about 2.5–4.5 with mild agitation. Precipitate forms and the slurry containing it is passed to a liquid/solid separator 12 which may be, for example, a filter press, and the precipitate is removed at 14 while the filtrate flows into reactor 18 through line 16. Reactor 18 may be substantially the same type of reactor as reactor 10. The filtrate from separator 12 is treated in reactor 18 with additional caustic through line 20 to further adjust the pH of the solution upward to 4.5 to 7 under similar heating and agitation conditions as in reactor 10. Precipitate forms and the slurry containing it is passed to a liquid-solid separator 22 which may consist of equipment similar to separator 12. The precipitate from separator 22 is removed through line 24 and the filtrate may be discharged directly into municipal sewage or pumped underground thru line 26.

Optionally, should it be desired to further treat the filtrate, it can be passed to reactor 28 and more caustic added to the reactor via line 30 to adjust the pH above 7 to produce additional precipitate. The slurry containing this precipitate is passed to liquid/solid separator 32 and solids are discharged through line 34 and filtrate liquid through line 36. The precipitates may be collected and, in the case of copper arsenate, used to produce chromated copper arsenate for wood preservative.

Alternatively, the multi-stage process is carried out in the system depicted in FIG. 2 of the drawings which is a single reactor 50. Wastewater is charged to the reactor through line 42 and sulfuric acid may be injected through line 44. Water-soluble salt is fed through line 46 and caustic through line 48 into the reactor, as activated by the operator. In the first stage, the reaction is continued for about an hour at the initial low pH caused by the incorporation of sulfuric acid and water-soluble salt into the wastewater in the reactor 50. As in FIG. 1, the reactor is equipped with heating and agitating means. On completion of the reaction, caustic, preferably NaOH granulars or solution, is slowly incorporated into the reactor via line 48 to increase the pH upward to about 2.5–4.5. This forms a precipitate in the wastewater and this slurry is passed into a liquid/solid separator 52. The precipitate is discharged through line 54 and the filtrate flows through lines 56 and 58 back to reactor 50. Additional caustic is brought into the filtrate through line 48 to bring the pH to between 4.5 and 7 to form more precipitate. The slurry produced by precipitate formation is passed to the liquid/solid separator 52 and, after separation, the precipitate discharged through line 54. The filtrate may be discharged to municipal sewage or pumped underground via line 60. Optionally, the filtrate may be recycled through line 58 back to the reactor and subjected to further upward pH adjustment, if desired.

EXAMPLES

The following examples are set forth to demonstrate the invention but are not to be construed as narrowing the breadth thereof.

Wastewater, or groundwater, as used herein has the following typical content and concentrations.

| Chemicals | Concentration (wt.) |
|---|---|
| Arsenic | approx. 4000 ppm |
| Calcium | approx. 1000 ppm |
| Chloroform | 160 ppb |
| Chlorobenzene | 94 ppb |
| Alpha BHC* | 490 ppb |
| Gramma BHC | 740 ppb |
| Beta BHC | 95 ppb |
| Delta BHC | 410 ppb |

*benzene hexachloride
ppm = parts per million
ppb = parts per billion
The pH of this typical wastewater is 5.5-5.7

EXAMPLE 1

Single Stage Reaction (Comparative Example)

Eight hundred grams of groundwater (with typical chemical contents of Table 1) was added to a stirred glass reactor. The reactor temperature was slowly raised to about 130°-140° F. and was maintained at 130°-140° F. throughout the run. 3.0 grams of concentrated sulfuric acid (>95%) was added into the reactor and the reactor pH dropped to about 1.4, followed by the addition of 16.3 grams of cupric nitrate salt, Cu(NO$_3$)$_2$.2.5 H$_2$O. The reactor pH further dropped to 1.1. After addition of the salt, the reaction was allowed to proceed for about forty minutes. 6.9 grams of NaOH granulars were slowly added over fifteen minutes to the reactor and the reactor pH increased to 7.3. The reactor slurry was filtered and the filtrate was found to have 2.45 ppm arsenic.

EXAMPLE 2

Multi-Stage Reaction

Five hundred grams of the groundwater was added into a stirred glass reactor. The reactor temperature was slowly raised to about 130°-145° F. and maintained within this range through out the run. 1.9 grams of concentrated sulfuric acid (>95%) was added to the reactor and the reactor pH dropped to about 1.2. 10.3 grams of cupric nitrate salt, Cu(NO$_3$)$_2$.2.5 H$_2$O, was then added to the reactor. The reactor pH further dropped to about 1. After addition of the salt, the reaction was allowed to proceed for 5 minutes. 3.7 grams of NaOH granulars were slowly added into the reactor and the reactor pH increased to about 4. The resulting precipitate formed a slurry in the reactor and the slurry was filtered. This first filtrate was found to have 948 ppm arsenic. The pH of the first filtrate was further adjusted to about 6 by adding 1.1 grams of NaOH granulars and the resulting slurry was filtered again. The resulting second filtrate contained less than 0.05 ppm arsenic. The pH of the second filtrate was further adjusted with 0.1 gram of NaOH granulars to 12.5 and the formed slurry was filtered again. The arsenic content of this third filtrate was less than 0.05 ppm. Typically, a two-stage operation should be sufficient to reduce the concentrations of heavy metals to meet the national drinking water standards.

Compared to Example 1, the arsenic removal efficiency with the two or three-stage precipitation process was much higher. As far as arsenic is concerned, the filtrates from the multi-stage precipitation process should meet the discharge regulations imposed by governmental regulations. The filtrate from the single stage precipitation process outlined in Example 1 contained 2.45 ppm arsenic which is far above the arsenic level 0.05 ppm allowed in the national drinking water standards.

I claim:

1. A process for the removal of arsenic dissolved in an aqueous solution comprising reacting said arsenic with an inorganic water-soluble metal salt at a pH of between about 1 and 2 to form a water-soluble metal arsenate wherein said metal is from Group Ib, IIb, or VIII of the periodic table, adjusting the pH of said solution to between about 2.5 and 4.5 to form a first metal arsenate precipitate wherein said metal is the same as that of said water-soluble metal arsenate, filtering said first precipitate and recovering a first filtrate, adjusting the pH of said first filtrate to a pH between about 4.5 and 7 to form a second metal arsenate precipitate wherein said metal is the same as that of said water-soluble metal arsenate, filtering the second precipitate and recovering a second filtrate, and, optionally, further adjusting the pH of said second filtrate upward to form a third precipitate, filtering the third precipitate, and recovering a third filtrate.

2. The process of claim 1 wherein the reaction of arsenic with said inorganic water-soluble metal salt is carried out in the presence of a sufficient amount of sulfuric acid to adjust the pH of said aqueous solution to between about 1 and 2.

3. The process of claim 2 wherein the upward pH adjustment, in each occurrence, is carried out by the addition of an inorganic base to said solution.

4. The process of claim 3 wherein said inorganic base is an alkali metal hydroxide.

5. The process of claim 1 wherein each precipitation is carried out in a separate reactor.

6. The process of claim 5 wherein filtration of each slurry is carried out in a separate filter press.

7. The process of claim 1 wherein each precipitation is carried out in the same reactor.

8. The process of claim 7 wherein each filtration is carried out in the same filter press.

* * * * *